United States Patent
Konik et al.

(10) Patent No.: US 7,747,882 B2
(45) Date of Patent: Jun. 29, 2010

(54) DETERMINING OPTIMAL POWER DOWN OF A SYSTEM WHILE INDEXES ARE BEING REBUILT

(75) Inventors: Rafal Przemyslaw Konik, Oronoco, MN (US); Mark William Theuer, Rochester, MN (US); Michael Alan Venz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 11/625,389

(22) Filed: Jan. 22, 2007

(65) Prior Publication Data

US 2008/0178012 A1     Jul. 24, 2008

(51) Int. Cl.
*G06F 1/00*     (2006.01)
*G06F 7/00*     (2006.01)
*G06F 17/00*    (2006.01)
*G06F 17/30*    (2006.01)

(52) U.S. Cl. .............................. 713/300; 707/1; 707/2; 707/100; 707/101; 707/102

(58) Field of Classification Search ................. 713/300; 707/1, 2, 100, 101, 102
See application file for complete search history.

(56) References Cited

U.S. PATENT DOCUMENTS

| | | | | |
|---|---|---|---|---|
| 5,603,037 A * | 2/1997 | Aybay | ......................... | 713/322 |
| 5,958,055 A * | 9/1999 | Evoy et al. | .................. | 713/310 |
| 2002/0184547 A1* | 12/2002 | Francis et al. | ............... | 713/322 |
| 2003/0074592 A1* | 4/2003 | Hasegawa | .................... | 713/324 |
| 2007/0234086 A1* | 10/2007 | Bernstein et al. | ............ | 713/310 |
| 2007/0283180 A1* | 12/2007 | Nakajima | .................... | 713/340 |
| 2008/0052545 A1* | 2/2008 | Finkelstein et al. | ......... | 713/300 |

\* cited by examiner

*Primary Examiner*—Mark Connolly
(74) *Attorney, Agent, or Firm*—Dillon & Yudell LLP; Robert R. Williams

(57) ABSTRACT

A method, system and computer-readable medium for managing the building of indexes are presented. In one embodiment, the method includes the steps of: initiating an index rebuilding process in a computer; detecting a "Power down" command for the computer; evaluating a progress level of the index rebuilding process; in response to the index rebuilding process exceeding a predetermined completion level, delaying the "Power down" command until the index rebuilding process is completed; and in response to the index rebuilding process being less than the predetermined completion level, aborting the index rebuilding process and executing the "Power down" command.

14 Claims, 3 Drawing Sheets

DETERMINING OPTIMAL POWER DOWN OF A SYSTEM WHILE INDEXES ARE BEING REBUILT

BACKGROUND OF THE INVENTION

1. Technical Field

The present technical field relates in general to the field of data processing, and, in particular, to software. Still more particularly, the present technical field relates to optimizing the use of indexes.

2. Description of the Related Art

From a high-level perspective, a computer can be viewed as a collection of hardware that, under the control of a software operating system, executes software instructions to manipulate data (including values, images, etc.). Locating instructions and data in an efficient manner is critical for optimal operation of a computer. To facilitate locating such instructions and data, a variety of techniques is utilized. The most common techniques use indexes.

Simply stated, an index provides an efficient means for locating files through the use of a reference table. Typically, an index includes a table of contents for a computer file, and includes keys or references for locating specific elements of that computer file. For example, assume that data is stored in an array ("computer file") named "ARRAY". The third element ("specific element") in the array may be called "ARRAY (3)". Thus, the key "ARRAY" and the reference "3" allow a program to locate and retrieve the data by referencing "ARRAY" and "3". If an index is used with a file directory tree, then an access path (e.g., Main directory/subdirectory/sub-subdirectory/folder/file) to the specific file can quickly be generated.

An index may incorporate the use of a pointer, an object, an offset value, or any other software used to reference data in an indexed manner. A pointer, as the name suggests, has a value that refers to ("points to") another value or an address in memory. Such pointers provide a quick access to rows in a table, columns, etc.

Oftentimes, an index needs to be rebuilt. Events that prompt such index rebuilding include routine software maintenance, the installation of new programs, etc. When an operator attempts to shut down a computer system, either in a delayed or immediate mode, the system may be in the process of rebuilding one or more indexes. If the index rebuilding operation has not completed before the system is powered down, the index rebuilding work will be lost and must be performed again when the system is powered back up. This is extremely wasteful of the computer's resources. For example, if system jobs are rebuilding twelve indexes, and each index takes ten hours to rebuild, shutting down the system just before the end of the index rebuilding process will result in 120 hours of wasted computer time.

SUMMARY OF THE INVENTION

To address the problem described above, presented herein are a method, system and computer-readable medium for managing the building of indexes. In one embodiment, the method includes the steps of: initiating an index rebuilding process in a computer; detecting a "Power down" command for the computer; evaluating a progress level of the index rebuilding process; in response to the index rebuilding process exceeding a predetermined completion level, delaying the "Power down" command until the index rebuilding process is completed; and in response to the index rebuilding process being less than the predetermined completion level, aborting the index rebuilding process and executing the "Power down" command.

The above, as well as additional purposes, features and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1A:
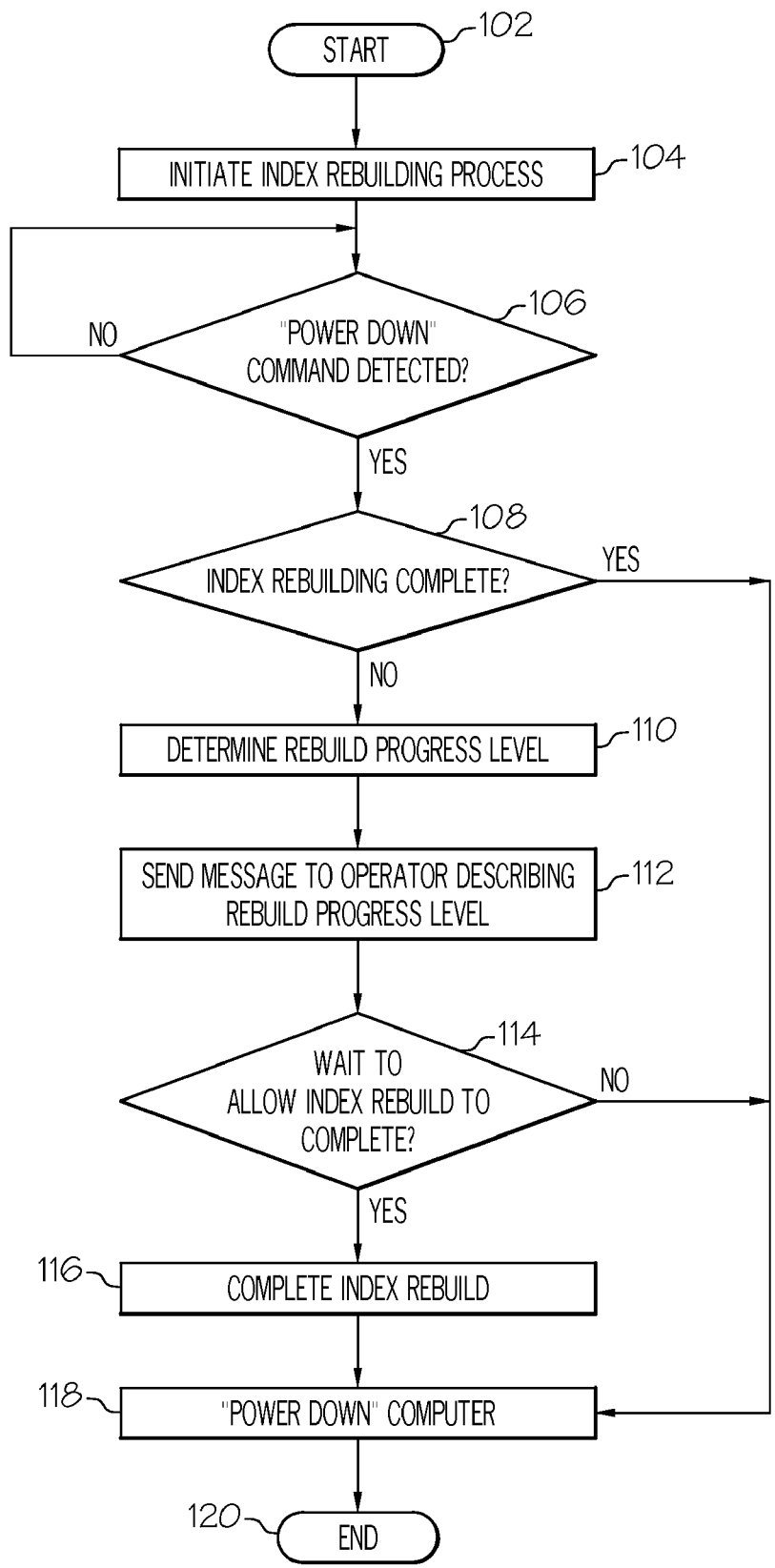
FIGS. 1a-b are flow-charts of exemplary steps taken for managing the process of rebuilding indexes in a computer system.

With reference now to the figures, and particularly to FIG. 1a, there is a flowchart of exemplary steps taken to manage the rebuilding of indexes in a computer. After initiator block 102 (which may be prompted, for example, by scheduled software maintenance), the index rebuilding process is initiated (block 104). This index rebuilding process can be the result of a computer being powered on, the execution of routine or special software maintenance, or any other event that causes indexes to be rebuilt. In response to a "Power down" command being detected (query block 106), a determination is made as to whether the index rebuilding process has been completed (query block 108). If so, then the computer is allowed to "Power down" normally (block 118), and the process end (terminator block 120). Otherwise, the index rebuilding progress level is determined (block 110).

Figure 1B:
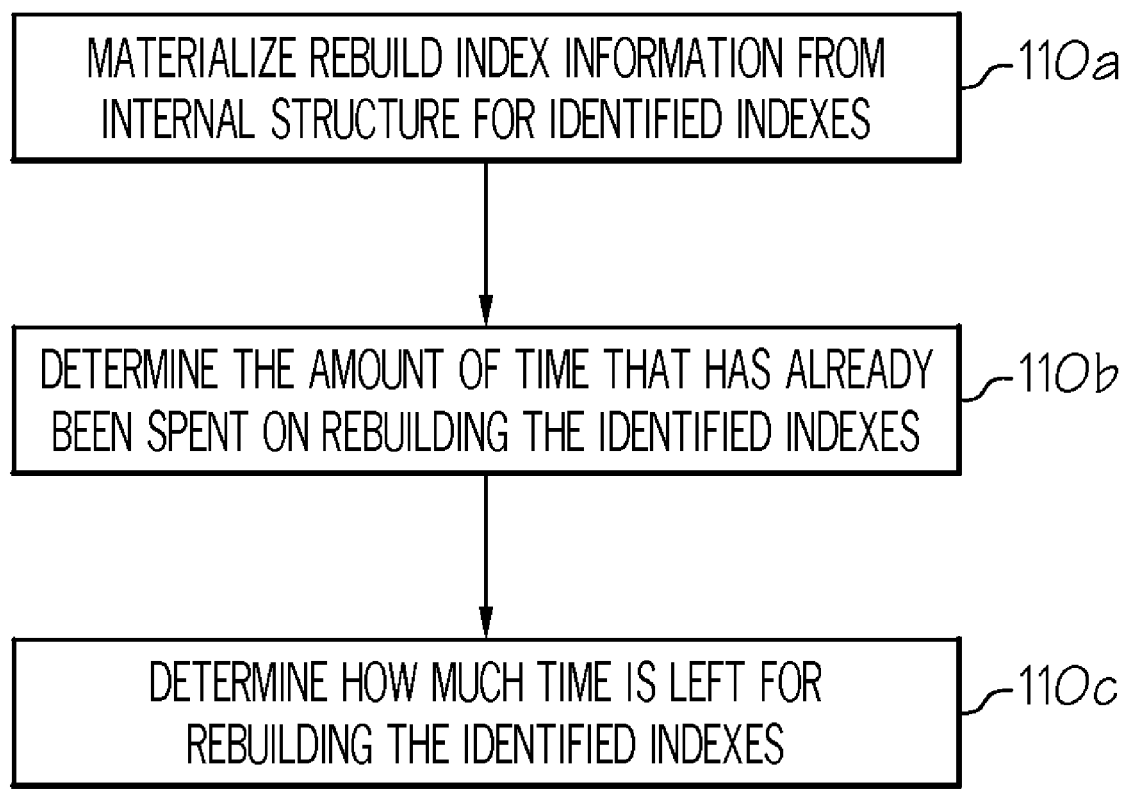

Exemplary steps taken to determine the rebuilding progress level (block 110) are shown in FIG. 1b in blocks 110a-c. As shown in block 110a, the index rebuilding progress level determination first materializes index rebuilding information from an internal structure. That is, a program (such as Index Rebuilding Program—IRP 248 shown in FIG. 2) determines which index or indexes are in the process of being rebuilt. For each identified index (that is in the process of being rebuilt), the amount of time that has already been spent rebuilding the index is determined (block 110b). This time can be determined from a timer value that is extracted from IRP 248 or from any other timing mechanism available for measuring how long the index rebuilding has taken. The amount of time needed to complete the index rebuilding for the identified index is then calculated (block 110c). This calculation can be done by extrapolating the amount of time already taken in the rebuild process. For example, if the rebuilding process is 60% complete, and the time used so far is six hours, then it can be extrapolated that another four hours are needed to complete remaining 40% of the index rebuilding task. Extrapolating is but one example of how the remaining time can be calculated. Any other available method for calculating the remaining time may similarly be utilized.

Returning to FIG. 1a, once the index rebuilding progress level has been determined (block 110), an inquiry message is sent to an operator (block 112). This message, which may be sent to a console for examination by a human operator, or may be a software message sent to a managing program such as IRP 248, describes how long the index rebuilding has been in progress, and how much longer is needed to complete the index rebuild. A query (query block 114) is made to determine if the index rebuilding process should be allowed to complete before the computer is powered down. The decision to complete or abort the index rebuilding process may be performed manually by an operator or automatically according to an algorithm in a managing program such as IRP 248. If it is decided that the index rebuilding should be allowed to complete, then the index rebuilding is completed (block 116) before the computer is powered off (block 118) and the process ends (terminator block 120). If it is decided that the index rebuilding process should be aborted, then the computer is immediately powered off (block 118) and the process ends (terminator block 120).

The decision as to whether the index rebuilding process is allowed to be completed may be based on a pre-determined percentage of index rebuilding completion (either completion of tasks or passage of job time) that has occurred, or other factors determined by an administrator or an administrative program, such as an operator's work schedule, a time of day, a date, etc. That is, if the operator needs to monitor the index rebuilding operation, and it is near the end of the operator's shift, then the operator may or may not be justified in aborting the index rebuilding process. Thus, if only thirty minutes of overtime are needed to allow a ten-hour rebuilding process to be completed, then the operator should likely allow the process to be completed. However, if another six hours of a seven hour process are needed at quitting time, then the operator would be justified in aborting the index rebuilding process.

Figure 2:
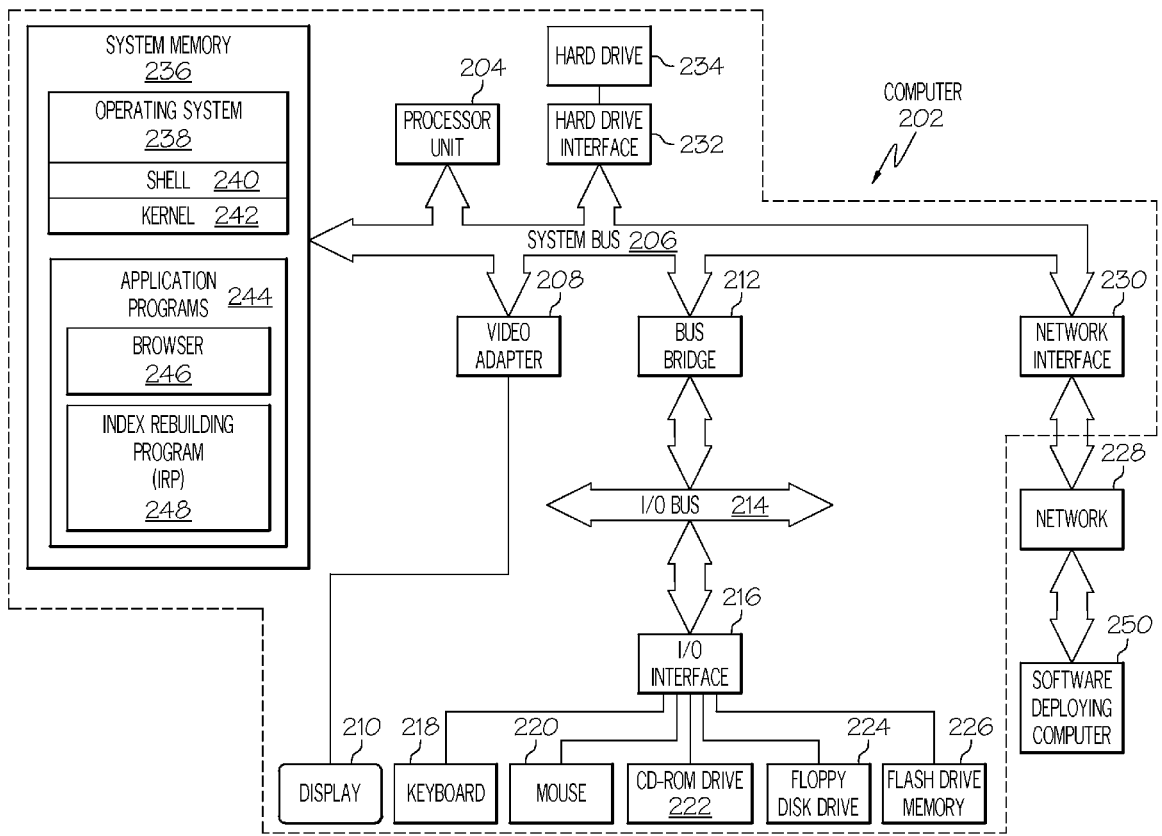
FIG. 2 illustrates an exemplary computer in which the present invention may be utilized.

With reference now to FIG. 2, there is depicted a block diagram of an exemplary computer 202 in which the present invention may be utilized. Computer 202 includes a processor unit 204 that is coupled to a system bus 206. A video adapter 208, which drives/supports a display 210, is also coupled to system bus 206. System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Computer 202 is able to communicate with a software deploying computer 250 via a network 228 using a network interface 230, which is coupled to system bus 206. Network 228 may be an external network such as the Internet, or an internal network such as an Ethernet or a Virtual Private Network (VPN).

A hard drive interface 232 is also coupled to system bus 206. Hard drive interface 232 interfaces with a hard drive 234. In a preferred embodiment, hard drive 234 populates a system memory 236, which is also coupled to system bus 206. System memory is defined as a lowest level of volatile memory in computer 202. This volatile memory includes additional higher levels of volatile memory (not shown), including, but not limited to, cache memory, registers and buffers. Data that populates system memory 236 includes computer 202's operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present invention will equally well support other user interface modes, such as graphical, voice, gestural, etc.

As depicted, OS 238 also includes kernel 242, which includes lower levels of functionality for OS 238, including providing essential services required by other parts of OS 238 and application programs 244, including memory management, process and task management, disk management, and mouse and keyboard management.

Application programs 244 include a browser 246. Browser 246 includes program modules and instructions enabling a World Wide Web (WWW) client (i.e., computer 202) to send and receive network messages to the Internet using Hyper-Text Transfer Protocol (HTTP) messaging, thus enabling communication with software deploying computer 250. In one embodiment of the present invention, software deploying computer 250 may utilize a same or substantially similar architecture as shown and described for computer 202.

Also stored with system memory 236 is an Index Rebuilding Program (IRP) 248, which includes some or all software code needed to perform the steps described in FIGS. 1a-b. IRP 248 may be deployed from software deploying computer 250 to computer 202 in any automatic or requested manner, including being deployed to computer 202 in an on-demand basis. Similarly, IRP 248 may be deployed to computer 202 from another software deploying server (not shown).

The hardware elements depicted in computer 202 are not intended to be exhaustive, but rather are representative to highlight essential components required by the present invention. For instance, computer 202 may include alternate memory storage devices such as magnetic cassettes, Digital Versatile Disks (DVDs), Bernoulli cartridges, and the like. These and other variations are intended to be within the spirit and scope of the present invention.

As noted above, it is to be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media, including but not limited to tangible computer-readable media, when carrying or encoded with a computer program having computer readable instructions that direct method functions in the present invention, represent alternative embodiments of the present invention. Further, it is understood that the present invention may be implemented by a system having means in the form of hardware, software, or a combination of software and hardware as described herein or their equivalent.

Thus, in one embodiment, the present invention may be implemented through the use of a computer-readable medium encoded with a computer program that, when executed, performs the inventive steps described and claimed herein.

Thus, presented herein are a method, system, and computer-readable medium for managing a rebuilding of indexes in a computer. In a preferred embodiment, the method includes the steps of: initiating an index rebuilding process in a computer; detecting a "Power down" command for the computer; evaluating a progress level of the index rebuilding process; in response to the index rebuilding process exceeding a predetermined completion level, delaying the "Power down" command until the index rebuilding process is completed; and in response to the index rebuilding process being less than the predetermined completion level, aborting the index rebuilding process and executing the "Power down" command. The predetermined completion level may be based on how long the index rebuilding process takes, or the predetermined completion level may be based on how many steps are in the index rebuilding process. Furthermore, a decision to complete or abort the index rebuilding process may be based in part on an operator's work schedule. In one embodiment, computer executable instructions used to perform the steps described in the method are deployable from a software deploying server to a client computer that is at a remote location. These instructions may be provided by a software deploying server to a client computer in an on-demand basis.

As described herein, when an operator attempts to power down a computer system, the computer system determines if indexes are currently being rebuilt, and will provide, to an operator of the computer system, a current status of the rebuild of the indexes. An inquiry message may be sent to the operator informing the operator of the status of the indexes to be rebuilt, and will let the operator decide if the system should be immediately shut down, or if the shut down should be delayed until the index rebuilding operation is completed. That is, the computer system determines which indexes are being rebuilt, and then materializes information from internal structures about the state of the indexes being rebuilt (amount of time before the index(es) is/are completely rebuilt, and the amount of time already spent rebuilding the index(es)). This information is then sent to the operator.

While the invention has been particularly shown and described with reference to a preferred embodiment, it will be understood by those skilled in the art that various changes in form and detail may be made therein without departing from the spirit and scope of the invention.

What is claimed is:

1. A method for managing a rebuilding of indexes in a computer, the method comprising:
   initiating an index rebuilding process in a computer;
   detecting a "Power down" command for the computer;
   evaluating a progress level of the index rebuilding process;
   in response to the index rebuilding process exceeding a predetermined completion level, delaying the "Power down" command until the index rebuilding process is completed; and
   in response to the index rebuilding process being less than the predetermined completion level, aborting the index rebuilding process and executing the "Power down" command.

2. The method of claim 1, wherein the predetermined completion level is based on how long the index rebuilding process takes.

3. The method of claim 2, wherein a decision to complete or abort the index rebuilding process is based in part on an operator's work schedule.

4. The method of claim 1, wherein the predetermined completion level is based on how many steps are in the index rebuilding process.

5. A system comprising:
   a processor;
   a data bus coupled to the processor;
   a memory coupled to the data bus; and
   a computer-usable medium embodying computer program code, the computer program code comprising instructions executable by the processor and configured for:
   initiating an index rebuilding process in a computer;
   detecting a "Power down" command for the computer;
   evaluating a progress level of the index rebuilding process;
   in response to the index rebuilding process exceeding a predetermined completion level, delaying the "Power down" command until the index rebuilding process is completed; and
   in response to the index rebuilding process being less than the predetermined completion level, aborting the index rebuilding process and executing the "Power down" command.

6. The system of claim 5, wherein the predetermined completion level is based on how long the index rebuilding process takes.

7. The system of claim 6, wherein a decision to complete or abort the index rebuilding process is based in part on an operator's work schedule.

8. The system of claim 5, wherein the predetermined completion level is based on how many steps are in the index rebuilding process.

9. A computer-readable storage medium embodying computer program code for managing a rebuilding of indexes in a computer, the computer program code comprising computer executable instructions configured for:
   initiating an index rebuilding process in a computer;
   detecting a "Power down" command for the computer;
   evaluating a progress level of the index rebuilding process;
   in response to the index rebuilding process exceeding a predetermined completion level, delaying the "Power down" command until the index rebuilding process is completed; and
   in response to the index rebuilding process being less than the predetermined completion level, aborting the index rebuilding process and executing the "Power down" command.

10. The computer-readable medium of claim 9, wherein the predetermined completion level is based on how long the index rebuilding process takes.

11. The computer-readable medium of claim 10, wherein a decision to complete or abort the index rebuilding process is based in part on an operator's work schedule.

12. The computer-readable medium of claim 9, wherein the predetermined completion level is based on how many steps are in the index rebuilding process.

13. The computer-readable medium of claim 9, wherein the computer executable instructions are deployable from a software deploying server to a client computer that is at a remote location.

14. The computer-readable medium of claim 9, wherein the computer executable instructions are provided by a software deploying server to a client computer in an on-demand basis.

* * * * *